United States Patent [19]

Murahashi et al.

[11] Patent Number: 5,070,374
[45] Date of Patent: Dec. 3, 1991

[54] COLOR IMAGE FORMING APPARATUS

[75] Inventors: Takashi Murahashi; Masashi Sugano; Hiroyuki Maruyama; Jun Yokobori, all of Hachioji, Japan

[73] Assignee: Konica Corporation, Tokyo, Japan
[21] Appl. No.: 622,595
[22] Filed: Dec. 5, 1990

[30] Foreign Application Priority Data

Dec. 6, 1989 [JP] Japan ................................ 1-317292
Dec. 6, 1989 [JP] Japan ................................ 1-317293

[51] Int. Cl.$^5$ ........................................... G03G 15/01
[52] U.S. Cl. ....................................... 355/326; 358/75
[58] Field of Search ...................... 355/246, 326, 327; 346/157; 358/75, 80

[56] References Cited

U.S. PATENT DOCUMENTS

| | | | |
|---|---|---|---|
| 4,668,978 | 5/1987 | Gokita | 358/78 |
| 4,935,787 | 6/1990 | Maeda et al. | 355/326 |
| 4,952,986 | 8/1990 | Maeda et al. | 355/326 X |
| 4,959,669 | 9/1990 | Haneda et al. | 355/326 X |
| 5,023,662 | 6/1991 | Kusumoto et al. | 355/326 X |

Primary Examiner—R. L. Moses
Attorney, Agent, or Firm—Finnegan, Henderson, Farabow, Garrett, and Dunner

[57] ABSTRACT

A color image forming apparatus includes an image reader which reads an image of an original by scanning the original and separating the scanned image into at least two colors, an image processor which processes the output of the image reader to output at least two-color image data, an image recorder which forms at least two color images in the image region of an image retainer, the color images being formed on the basis of the image data and then transferred to copying paper, a color discrimination which discriminates chromatic conditions of first and second pages separately by preliminarily scanning under a continuous page copying mode and an automatic color selection mode, and a color controller for automatically determining available colors and copying processes on the basis of color data for the first page and likewise, available colors and copying processes on the basis of color date for the second page.

3 Claims, 9 Drawing Sheets

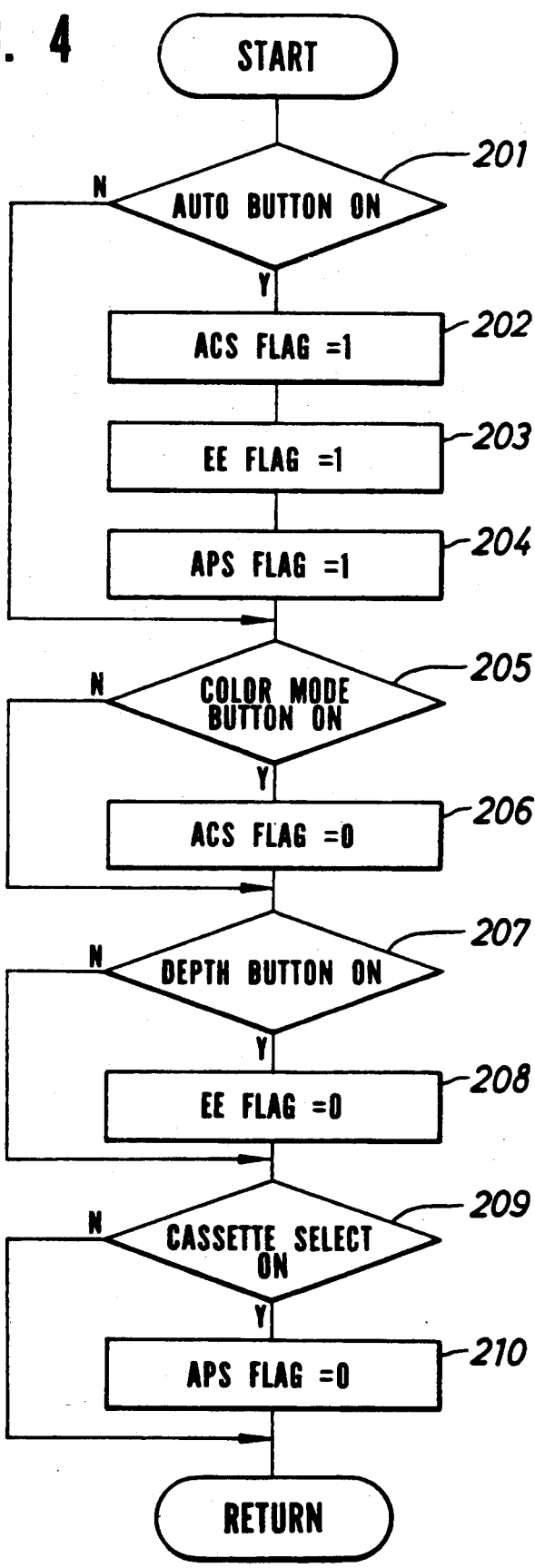

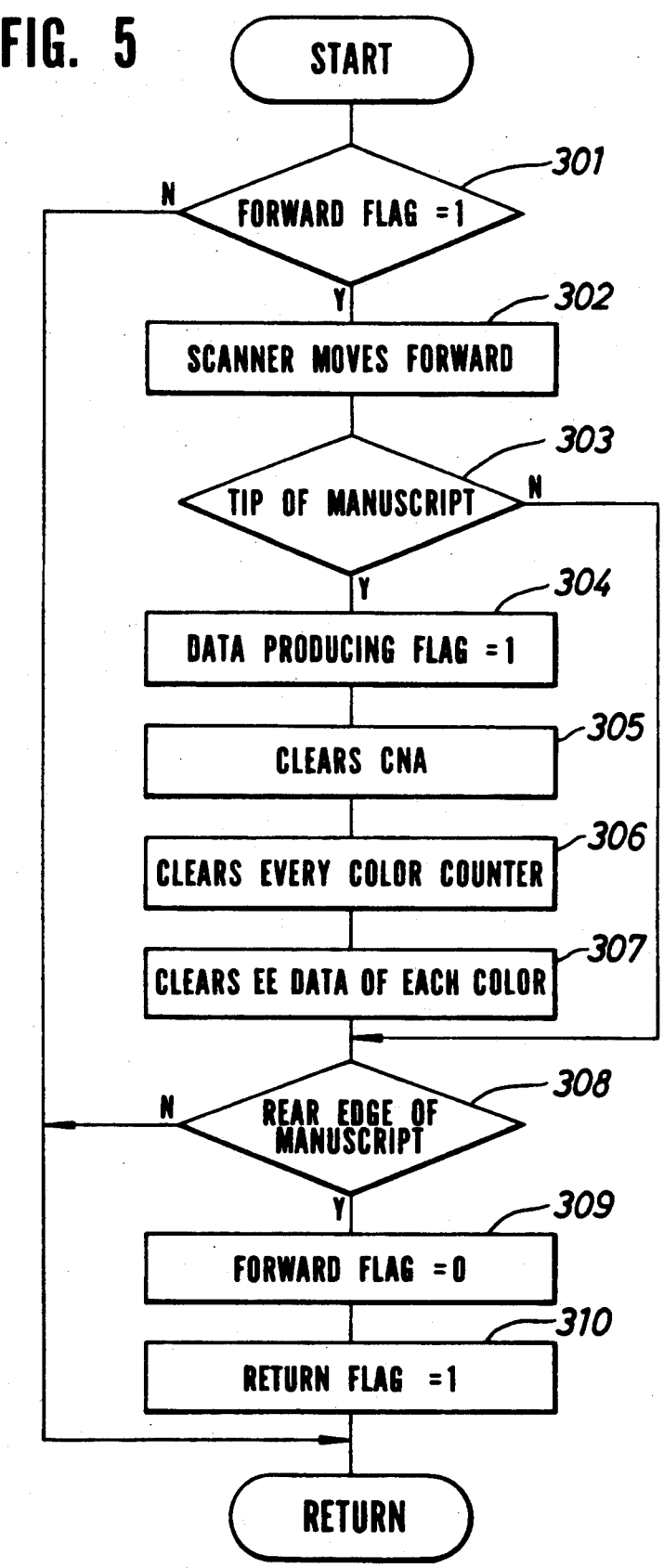

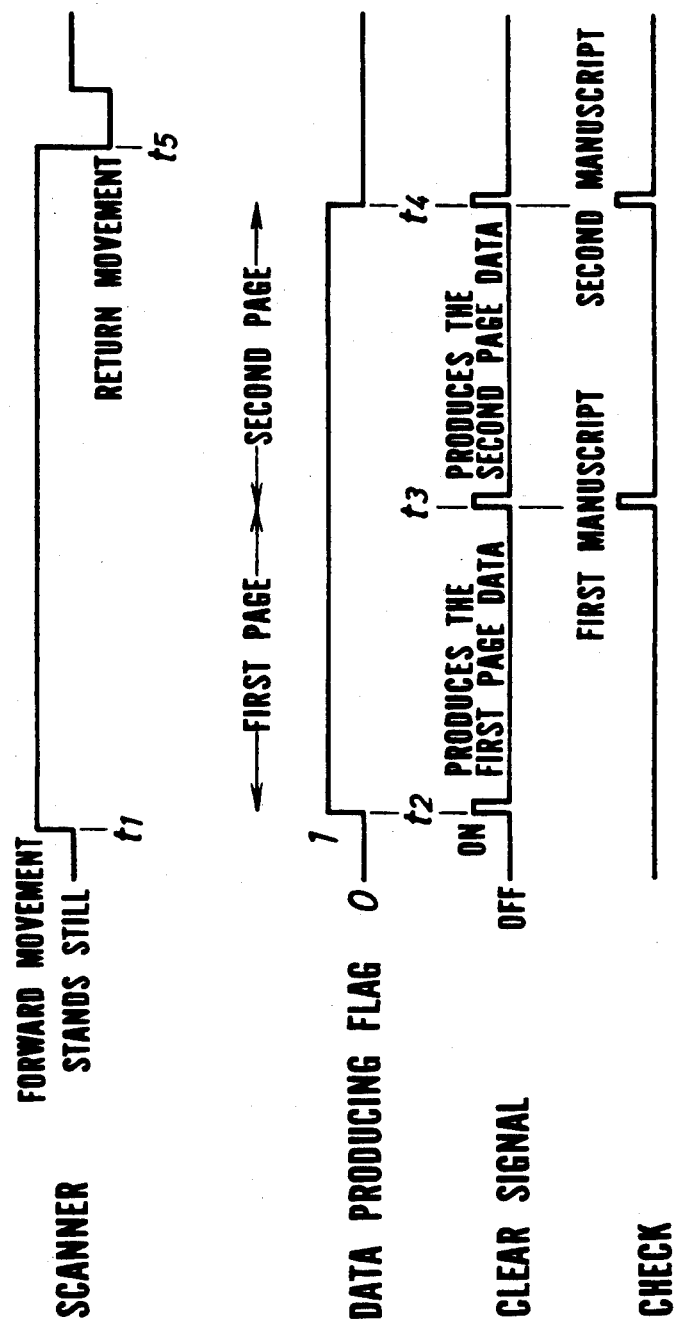

COLOR IMAGE FORMING APPARATUS

BACKGROUND OF THE INVENTION

1. Field of the Invention

The present invention relates to a color image forming apparatus such as for example electrophotographic color image copying apparatus which is capable of copying at least two color images.

2. Description of the Prior Art

There is known a conventional electrophotographic color image copying apparatus incorporating two functional modes including the one which continuously copies the image of two pages of an original onto two copying papers per page and the automatic color selection mode which automatically determines the copying process based on available colors after identifying the chromatic condition of the image of the original by performing a preliminary scanning operation prior to a normal scanning operation.

In case a copying operation is carried out in the automatic color selection mode and in the continuous page copying mode in a conventional copying apparatus, the copying apparatus discriminates the chromatic condition while reading of two pages of the original in the preliminary scanning operation and performs identical copying processes for copying the two-page content based on the total chromatic condition covering all the colors on these two pages. As a result, in case there is any difference in the chromatic condition between the color images on two pages, then the copying apparatus is obliged to perform additional wasteful copying routines. For example, if the first page of the original is of red and blue colors, whereas the second page is merely of black, thus making up three color image, then, the copying apparatus is obliged to perform the copying routines normally needed for copying the first and second pages with these three colors. Concretely, such processes needed for copying the first page of red and blue colors also include an additional useless process for copying with black, and likewise, when copying black image of the second page, those additional processes for copying with red and blue colors are uselessly performed as well.

SUMMARY OF THE INVENTION

The object of the invention is to provide a color image forming apparatus which automatically determines available colors and optimal copying processes per page of an original by executing a preliminary scanning operation for discriminating the chromatic condition of color image per page.

The color image forming apparatus embodied by the invention discriminates the chromatic conditions of the first and second pages of the original by executing a preliminary scanning operation prior to a normal copying operation in an automatic color selection mode and in a continuous page copying mode, and then, based on the chromatic condition of the color image of the first page, the copying apparatus automatically determines available colors and the optimal copying process for the first page, and then, based on the chromatic condition of the color image of the second page, the copying apparatus automatically determines available colors and the optimal copying process for the second page.

In consequence, even in case there is any difference in the chromatic conditions between the first and second pages of the original, the copying apparatus can properly execute those operations for precisely copying the color image of each page of the original by selecting optimal colors perfectly compatible with the chromatic condition of the original without additionally executing unnecessary copying operations. For example, when the first page is of red and blue and the second page is of black, the copying apparatus executes only those routines needed for copying with red and blue colors for the first page based on the chromatic condition contained therein, and it merely executes a single copying routine needed for copying with black colors for the second page based on the chromatic condition contained therein without being obliged to additionally execute unnecessary copying routines.

BRIEF DESCRIPTION OF THE DRAWINGS

FIG. 4 shows a flowchart of an example of the routine for setting up the automatic color selection mode;

FIG. 5 shows a flowchart of an example of the routine for executing a preliminary scanning operation;

FIG. 7 shows a time chart relative to the functional operation of main components of the color image forming apparatus of the invention in the preliminary scanning operation.

DETAILED DESCRIPTION OF THE PREFERRED EMBODIMENTS

Referring now more particularly to the accompanying drawings, an electro-photographic color image copying apparatus according to an embodiment of the invention is described below.

Figure 1:
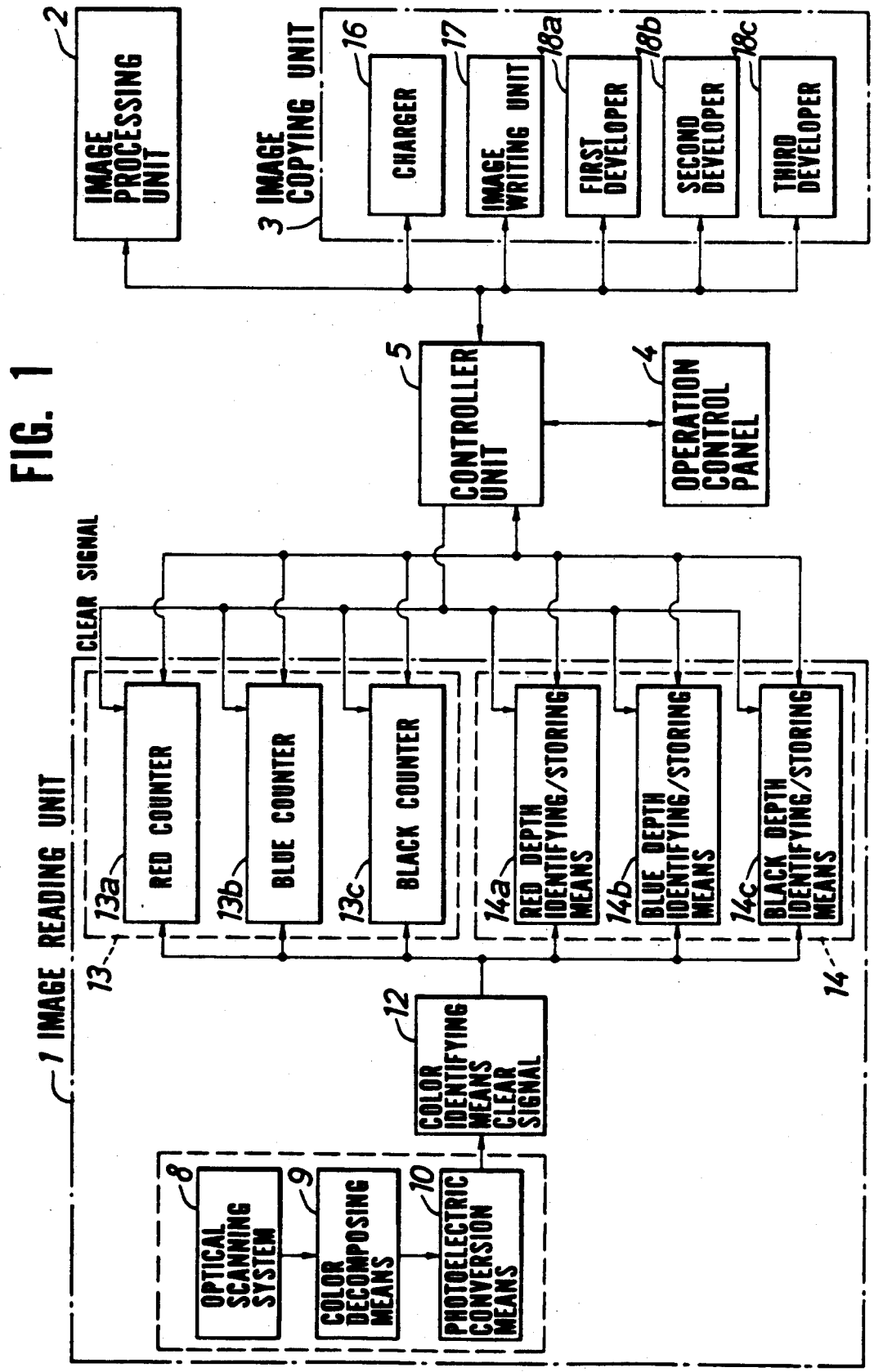
FIG. 1 schematically shows the overall arrangement of the color image forming apparatus according to an embodiment of the invention.
Figure 2:
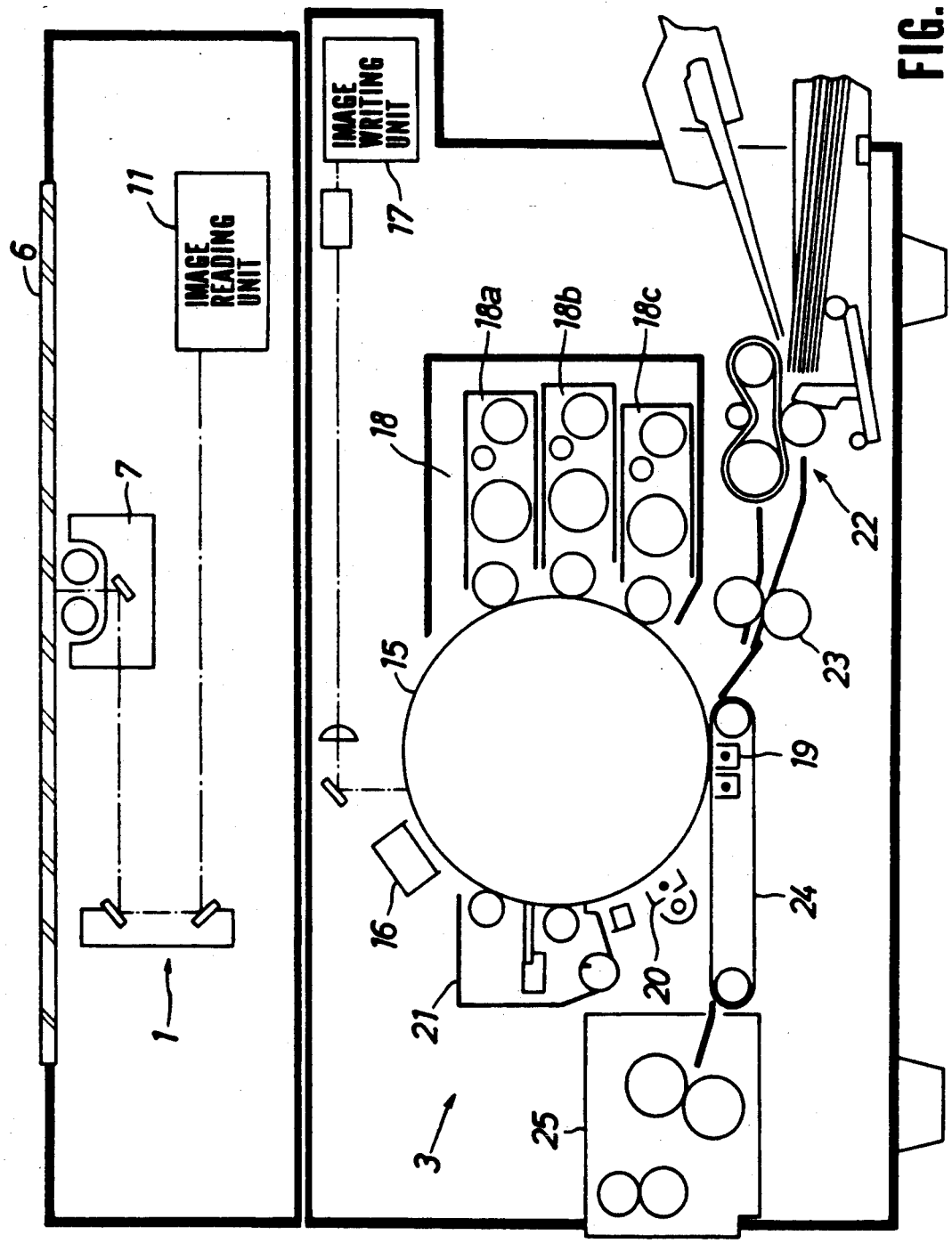
FIG. 2 schematically shows a mechanism of the color image forming apparatus according to an embodiment of the invention.

FIG. 1 schematically shows the overall arrangement of the color image forming apparatus according to an embodiment of the invention. FIG. 2 schematically shows the main mechanism of the color image forming apparatus according to an embodiment of the invention.

The electrophotographic color image forming apparatus embodied by the invention substantially consists of: (1) An image reading (scanning) system, (2) an image processing system, (3) an image copying system, (4) an operation control panel, and (5) a controller unit, respectively.

The image reading system 1 comprises those functional elements for scanning the image of an original on a platten 6. The image reading system 1 then separates the scanned color image into three colors, and then converts the color data into electrical signals. These functional elements include the following; an optical scan system 8 incorporating a scanner 7, a color image reading unit 11 including a color separating means 9 like a dichroic mirror and a -photoelectric conversion means 10 like a CCD image sensor for example, a color identifying means 12, a plurality of color counters 13, and a color density detecting and storing means 14, respectively.

The following description refers to the color counter and the color density discriminating and storing means by applying the corresponding reference numerals 13 and 14, these means are further discriminated into a red counter 13a, a blue counter 13b, a black counter 13c, a red color density discriminating and storing means 14a, a blue color density discriminating and storing means 14b, and a black color density discriminating and storing means 14c, respectively.

The above three-color counters 13 and the threecolor density discriminating and storing means 14 are respectively composed of memories of a computer The image processing system 2 processes color image output from the image reading unit 11, and then transmits the processed image data to the controller unit 5.

The image copying system 3 is provided with a photosensitive drum 15 as an image retainer which forms an up image there on. Although not shown in FIG. 2, an image forming region having a specific size like A-3 paper size for example is provided on the surface of the photosensitive drum 15. A variety of functional devices are provided in the periphery of the photosensitive drum 15, which include a charger 16, a laserbeam datawriting unit 17, three-color developing units 18, a transfer unit 19, a discharger 20, a toner cleaning device 21, the second paper-feeding roller (resist roller) of the paper-feeding device 22, a separation belt 24, and a fixing unit 25, respectively.

The following description refers to the developing unit by means of the reference numeral 18, and, the developing unit 18 is further discriminated into the first developer 18a, the second developer 18b, and the third developer 18c. The first developer 18a stores red-color developing agent. The second developer 18b stores blue-color developing agent. The third developer 18c stores black color developing unit.

The operation control panel 4 is controlled by an operator who sets up the required copying condition.

The control unit 5 incorporates a microcomputer for controlling entire operations of the functional components of the color image forming apparatus embodied by the invention.

Next, functional operation of the color image forming apparatus embodied by the invention is described below.

First, when the scanner 7 of the optical scan system 8 scans the color image of an original on the platten 6, all the points printed on the original are separated into red, blue, and black components by the color separating system 9. Next, the photoelectric converter 10 outputs electrical signals which are proportional to the density of component colors. Based on the electrical signal output from the photoelectric converter 10, the color discriminating unit 12 discriminates colors and their density at all the points of the original, and then generates both color data and color-density (EE) data for delivery to the color counters 13 and the color density discriminating and storing unit 14. Concretely, the color discriminating unit 12 discriminates from the electrical signals output from the photoelectric converter 10 whether these colors at respective points of the original are either red, or blue, or black, or blank (white), and then activates those color counters 13 corresponding to each color to count a number one. If the presence of blank (white) were discriminating, neither of these color counters 13 counts the number. As a result, each of these color counters 13 counts up the rounds designating the appearance of the corresponding color to make up the color data. Furthermore, the color discriminating unit 12 classifies the density of respective colors into a plurality of steps, and then discriminates the corresponding steps of respective color depths covering all the points of the original. The color density discriminating and storing unit 14 is provided with those counters each counting the rounds designating the appearance of the corresponding colors as per the stepwise density. Whenever the color discriminating unit 12 discriminates colors and their density on the original, any of these counters dealing with the corresponding density step provided for the corresponding color density discriminating and storing unit 14 counts up the number one. As a result, each of the color density discriminating and storing units 14 stores the counted rounds designating the appearance of the corresponding colors in accordance with respective color-density steps. This leads to the generation of the color density distribution for composing the density data EE. Only when generation of data is in the permissible condition, color data and color density data EE can be generated, whereas these data cannot be generated in the inhibited condition. The color data stored in the color counter 13 and the color density data EE in the color density memory 14 are respectively cleared by effect of the clear signal from the control unit 5.

Density of the color image available for the copying operation is properly adjusted by way of controlling the γ correction data and MTF correction data derived from the control unit 5 to the image processing system 2, the laser power value of the image writing unit 17, charge potential of the charger 16, and the value of developing bias voltage of the developing unit 18, respectively.

The color image forming apparatus embodied by the invention can execute a monochromatic copying operation using any of those three colors including red, blue, and black. The color image copying apparatus can also execute multicolored copying operation using either two or three colors. Furthermore, the color image copying apparatus can also execute a single copying operation for merely copying a piece of copying paper per copying cycle and also continuous copying operations for copying identical color image on a number of copying papers per copying cycle.

When executing the monochromatic copying operation, first, the scanner 7 scans the image of the original, and then the image writing unit 17 writes the scanned image in the image region of the photosensitive drum 15, and then, the electrostatic latent image on the photosensitive drum 15 is developed by the developing unit 18. Formation of color image is achieved by executing a cycle of image scanning, writing, and developing processes, and then the developed image is transferred onto a copying paper which is delivered from the second paper-feeding roller 23 of the paper-feeding unit 22.

When copying monochromatic image on a copying paper, a cycle of image forming process is performed by the image scanner 7, the image writing unit 17, and any of those color developing units 18 while the photosensitive drum 15 fully rotates once. Simultaneously, a copying paper is delivered from the second paperfeeding roller 23 to allow the monochromatic image to be transferred from the image region of the photosensitive drum 15 onto a copying paper.

When continuously copying monochromatic image on a number of copying papers, while the photosensitive drum 15 continuously rotates itself, image forming processes are continuously executed by the image scanner 7, the image writing unit 17, and any of those color developing units 18 so that the monochromatic image can be transferred onto each of the continuously supplied copying papers.

When copying multicolored image on a copying paper, the image forming process is executed by fully rotating the photosensitive drum 15 twice or thrice. Concretely, when copying three colors on a copying paper, red image is formed by the image scanner 7, the image writing unit 17, and the first color developing unit 18a while the photosensitive drum 15 performs the first full turn. Next, while the photosensitive drum performs the second full turn, blue image is superimposed on the red image by the image scanner 7, the image writing unit 17, and the second developing unit 18b. Finally, while the photosensitive drum 15 performs the third full turn, black image is superimposed on the blue image by the image scanner 7, the image writing unit 17, and the third developing unit 18c. When copying two colors on copying paper, since one of these three colors is deleted, color image forming process is executed by rotating the photosensitive drum 15 twice. When copying three colors, the second paper-feeding roller 23 delivers a copying paper while the photosensitive drum 15 performs the third full turn. Likewise, when copying two colors, the second paper-feeding roller 23 delivers a copying paper while the photosensitive drum 15 performs the second full turn. In this way, multicolored image is transferred onto a copying paper.

On the other hand, when continuously copying multicolored image on a copying paper having a size greater than the "A-4" size for example, the "normal mode" copying operation is performed, in which a single image is formed in the image region of the photosensitive drum 15 before being transferred onto the above copying paper. When using a copying paper having a size smaller than the "A-4" size for example, a pair of the identical images are formed in the image region of the photosensitive drum 15 before each of these identical images are transferred onto two pieces of copying papers of the above size under the "two-piece copying mode".

When the "normal mode" is underway for copying image on a single copying paper, the scanner 7 scans the image of the original once while the photosensitive drum 15 performs a full turn to cause the image to be formed in the image region of the photosensitive drum 15. When the "two-piece" mode is underway, the scanner 7 scans the image of the original twice while the photosensitive drum 15 makes a full turn to cause a pair of the identical images to be formed in the image region of the photosensitive drum 15.

Characteristically, the color image forming apparatus embodied by the invention is capable of executing a variety of copying operations under those functional modes including the following; 1) the continuous page copying mode for copying image of two-page original on two copying papers page by page; the 2) automatic color selection (ACS) mode which identifies the chromatic condition of the image of the original by performing a preliminary scanning operation prior to the normal scanning operation before automatically selecting available colors; and the 3) automatic copy density adjusting mode (EE mode) which discriminates the density of color image of the original by performing a preliminary scanning operation before automatically adjusting the density of colors to be printed on copying papers. 4) combining 2) & 3). When simultaneously activating both the ACS and EE modes mentioned above, the chromatic and density conditions of the color image of the original can simultaneously be identified by performing a single round of preliminary scanning operation. The automatic copy density adjustment is performed for each color.

The continuous page copying mode can be entered merely by depressing a predetermined button switch on the operation control panel 4. In order to yield two pieces of the A-4 size color copy from an original having a size corresponding to A-4×2 pages (corresponding to the A-3 size) on the pattern by activating the continuous page copying mode, first, the copy operator selects a cassette storing the A-4 size copying papers, and then depresses the copy-start button switch. In order to copy monochromatic image, first, the first page of the original is scanned once, and then the image of the original is scanned once, and finally, the monochromatic image is transferred onto the second copying paper. To copy multicolored image, the content of the first page is scanned twice or thrice while the photosensitive drum 15 rotates itself twice of thrice, and then the scanned multicolored image is copied on the first copying paper. Next, the content of the second page is scanned twice or thrice while the photosensitive drum 15 rotates itself twice or thrice, and then the multicolored image of the second page is copied on the second copying paper.

Although the ACS and EE modes can be activated by depressing the AUTO button switch on the operation control panel 4, if the color mode switch on the operation control panel 4 were already depressed, then the ACS mode is released. On the other hand, if the color density switch were already depressed, then the EE mode is released.

When executing a color image forming operation by activating the ACS mode in conjunction with the EE mode, chromatic conditions of the first-and-second page original are individually discriminating in the course of a preliminary scanning operation. According to the chromatic condition scanned form the first page original, the color image forming apparatus automatically selects colors available for copying the first page, and likewise, according to the chromatic condition scanned from the second page original, the copying apparatus automatically selects colors available for copying the second page. Accordingly, even though there is any difference of the chromatic condition between the first and second page original, the image forming apparatus of the invention can correctly copy the actual color image of the original page by page based on the optimal color image formation process compatible with the chromatic condition of the color image printed on each page of the original. For example, if the first page of the original were printed with red and blue images, whereas the second page were printed with black image alone, then the color image forming apparatus executes only those routines needed for copying the red and blue images from the first page of the original, and then the image forming apparatus merely executes a single routine needed for copying only the black image from the second page of the original, thus effectively dispensing with unnecessary additional copying routines.

On the other hand, when executing a color image forming operation by activating the EE mode in conjunction with the continuous page copying mode, conditions of the density of color images of the first and second pages of the original are individually identified in the course of a preliminary scanning operation. According to the condition of the density of color image printed on the first page of the original, the density of color image needed for coping the first page of the original is automatically adjusted. Likewise, according to the condition of the density of color image printed on the second page of the original, the density of color image needed for copying the second page of the original is automatically adjusted. Accordingly, even through there is an extreme difference in the condition of the color depth between the color images of the first and second pages of the original, the color image forming apparatus can correctly copy the color image of the original page by page based on the optimal condition perfectly compatible with the condition of the density of color image of the original.

Next, referring to those flowcharts shown in FIGS. 3 through 6A to 6C and a timing chart shown in FIG. 7, an example of the functional operation of the color image forming apparatus embodied by the invention is described below.

Figure 3:
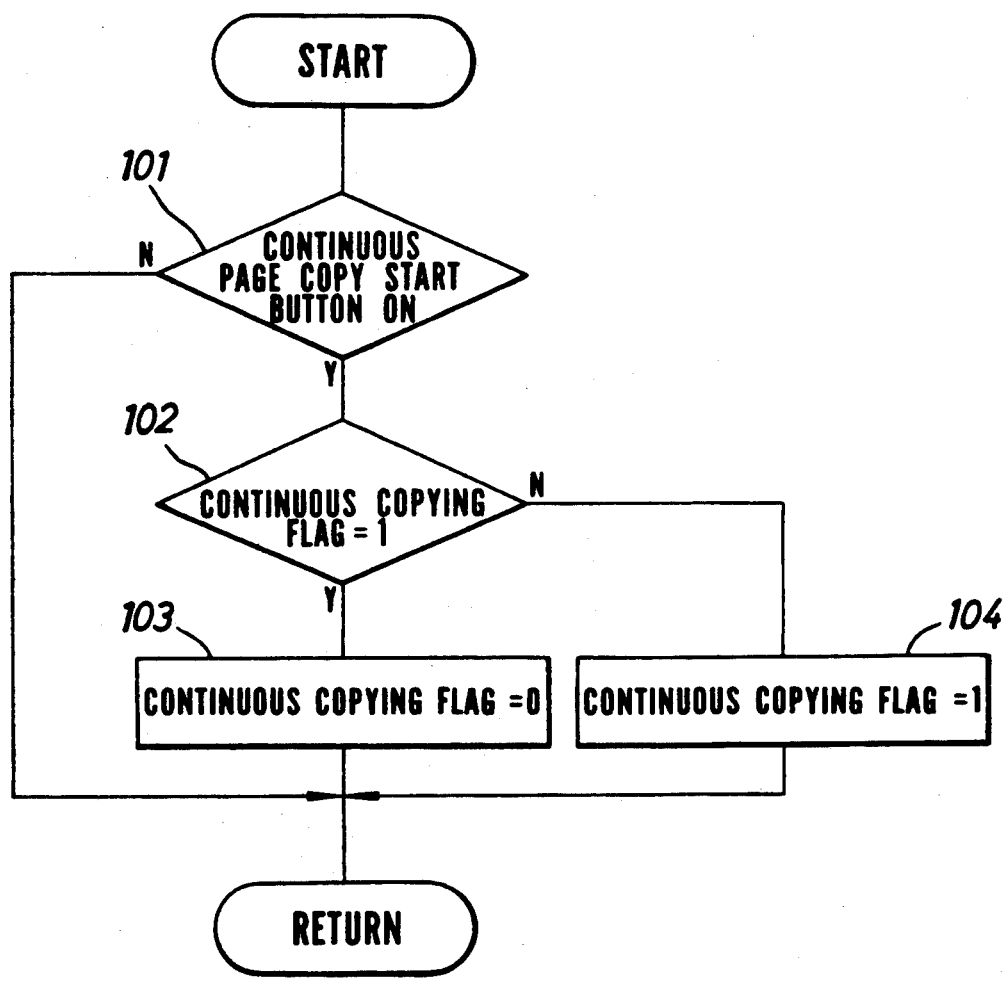
FIG. 3 shows a flowchart of an example of the routine for setting up the continuous page copying mode.

The flowchart shown in FIG. 3 designates the routine needed for setting up the continuous page copying mode. The flowchart shown in FIG. 4 designates the routine needed for setting up the automatic color selection (ACS) mode, the automatic color density adjustment (EE) mode, and the automatic paper selection (APS) mode, respectively. Any of these functional modes is executed once at a predetermined timewise interval during an idling period from the moment at which the power is turned ON to the moment when the copy-start button is depressed by a copy operator.

Referring now to the flowchart shown in FIG. 3, when the initial step 101 is entered, the control unit 5 checks to see if the continuous page copying button is depressed, or not. If the continuous page copying button were depressed, step 102 is entered, in which the controller 5 checks to see if the continuous page copying flag is set to "1", or not. If the continuous page copying flag were set to "1", then step 103 is entered to reset the continuous page copying flag to "0", thus completing the routine. If the continuous page copying flag were not set, then step 104 is entered to set the continuous page copying flag so that the whole routine can be terminated.

The continuous page copying flag is set simultaneous with the entry of the continuous page copying mode and reset simultaneous with the release from the continuous page copying mode, and thus, whenever depressing the continuous page copying button once, entry and release of the continuous page copying mode is repeated.

Next, referring to the flowchart shown in FIG. 4, when the initial step 201 is entered, the control unit 5 checks to see if the AUTO button is depressed, or not. If the AUTO button were already depressed, step 202 is entered, in which the automatic color selection flag (ACS flag) is set. Then, step 203 is entered to set the automatic color density adjustment flag (EE flag), and then step 204 is entered to set the automatic paper selection flag (APS flag) before proceeding to step 205. If the AUTO button were not depressed in the initial step 201, then the operation mode directly proceeds to step 205.

When step 205 is entered, the controller unit 5 checks to see if the color mode button were depressed, or not. If the color mode button were already depressed, step 206 is entered, in which the ACS flag is reset before proceeding to step 207. If the color mode button were not depressed in step 205, then the operation mode directly proceeds to step 207.

When step 207 is entered, the control unit 5 checks to see if the color density button were already depressed, or not. If this button were already depressed, then step 208 is entered, in which the EE flag is reset before proceeding to step 209. If the color density button were not depressed in the initial step 207, then the operation mode directly proceeds to step 209.

When step 209 is entered, the control unit 5 checks to see if the cassette selection button were already depressed, or not. If this button were already depressed, then step 210 is entered to reset the APS flag to complete the whole routine. If the cassette selection button were not depressed in the above step 209, the routine is also terminated.

The flowchart shown in FIG. 5 designates the routine needed for performing a preliminary scanning of the content of the original. The flowchart shown in FIGS. 6A to 6C designates the routine needed for discriminating the chromatic condition and the condition of the color density. These routines are respectively executed once at a specific timewise interval from the moment at which the copy-start button is depressed by a copy operator The timing chart shown in FIG. 7 designates functional operation of the main components of the image forming apparatus while the preliminary scanning operation is underway.

Referring to the flowchart shown in FIG. 5, when the initial step 301 is entered, the control unit 5 checks to see if the forward flag were already set, or not. The forward flag is activated when a preliminary scanning operation must be executed. If the forward flag were not set, there is no need of performing a preliminary scanning operation, and thus, the whole routine is terminated without activating any functional operation. If the forward flag were activated, the image forming apparatus executes those processes from step 302 on.

When step 302 is entered, the control unit 5 outputs a scanner-forward signal to move the scanner forward so that the preliminary scanning operation can be activated.

Next, step 303 is entered, in which the control unit 5 checks to see if the scanner 7 has already arrived at the tip of the first page of the original, or not. As soon as the scanner 7 arrives at the tip of the first page of the original, step 304 is entered, in which the data generating flag is activated. Next, step 305 is entered to clear the scanner position counter CPA, and then the ensuing step 306 is entered to clear all the color counters 13. When the following step 307 is entered, all the EE data stored in all the color density discriminating and storing units 14 are cleared, and then the following step 308 is entered. The data generating flag allows both the color counters 13 and the EE data memories 14 to generate color data. The scanner position counter CNA checks the actual position of the scanner 7. Based on another routine not shown , the scanner position counter CNA counts up one by one every predetermined period while the count enable condition is present. If the scanner 7 were not at the tip of the first page of the original while step 303 is underway, then the operation mode directly proceeds to step 308.

When step 308 is entered, the control unit 5 checks to see if the scanner 7 is at the rear edge of the second page of the original, or not. As soon as the scanner 7 arrives at the rear edge of the second page of the original, step 309 is entered to reset the forward flag. Next, step 310 is entered, in which the return flag is reset to terminate the whole routine. When the return flag is activated, the scanner return signal is output to bring the scanner 7 back to the home position. Since the forward flag is reset in step 309, all the further routines are processed in the course of step 301 until the forward flag is again activated, and thus no preliminary scanning operation is performed.

Figure 6A:
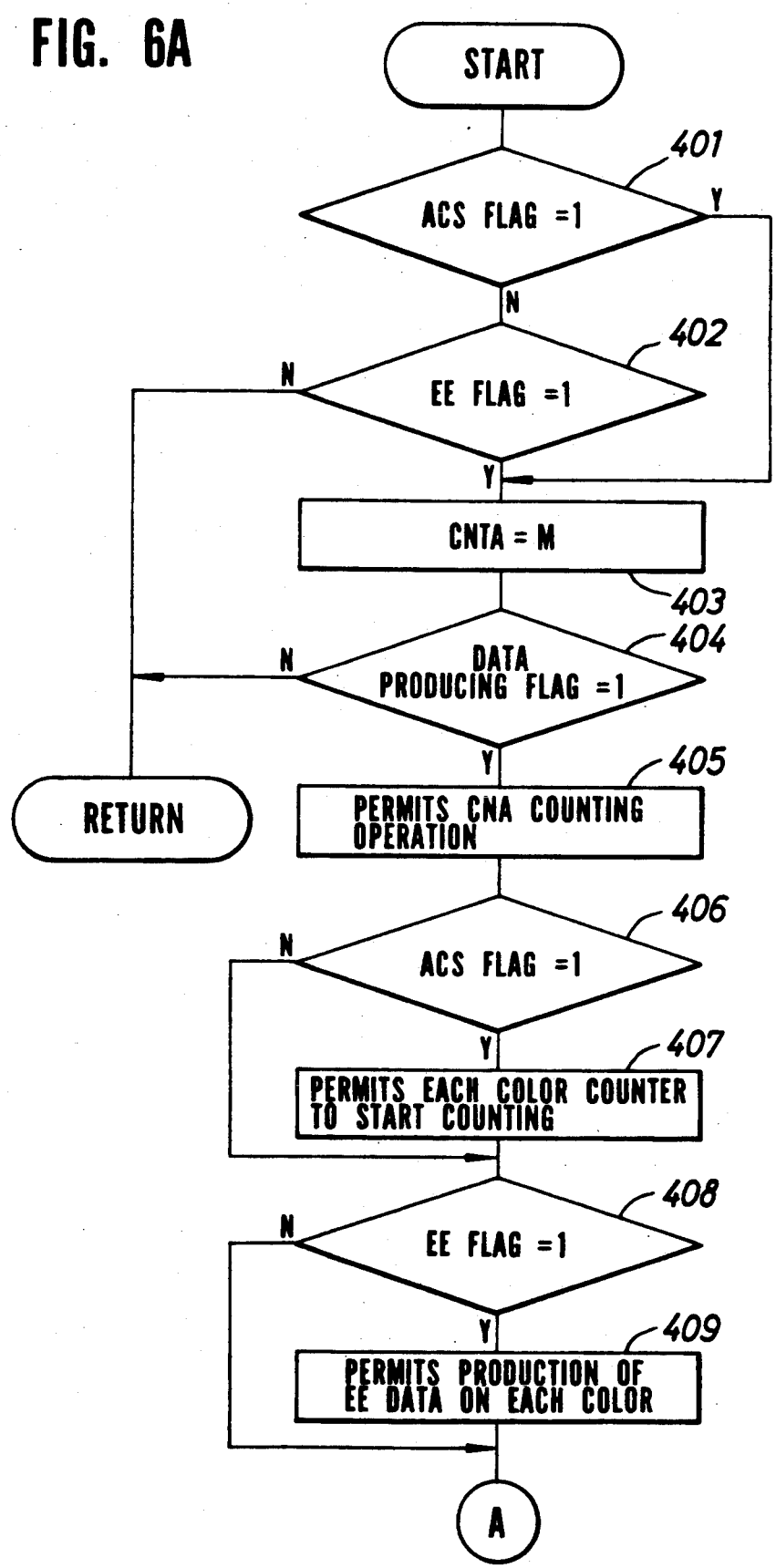
FIGS. 6A to 6C show a flowchart of the routine for identifying the chromatic and color density conditions.
Figure 6B:
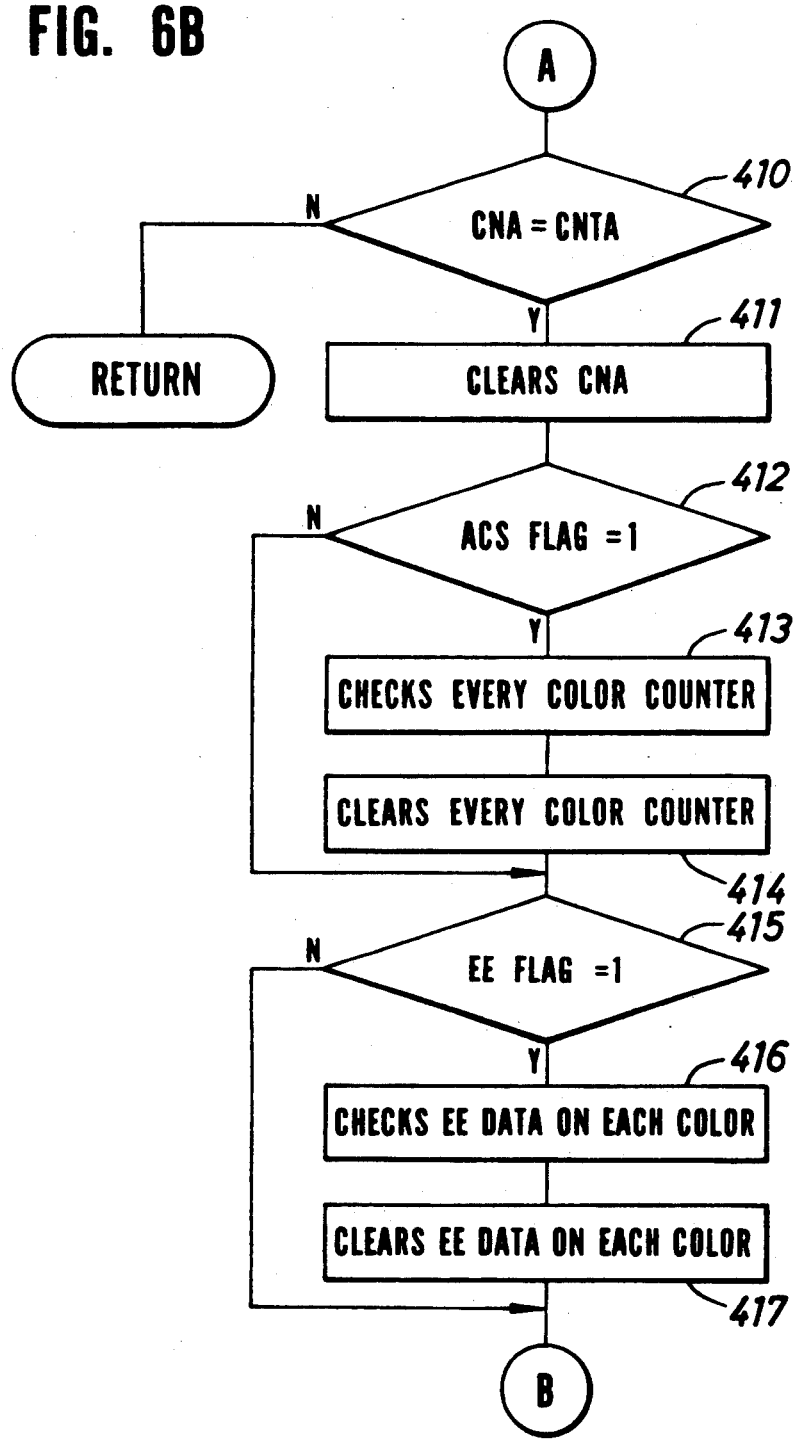
Figure 6C:
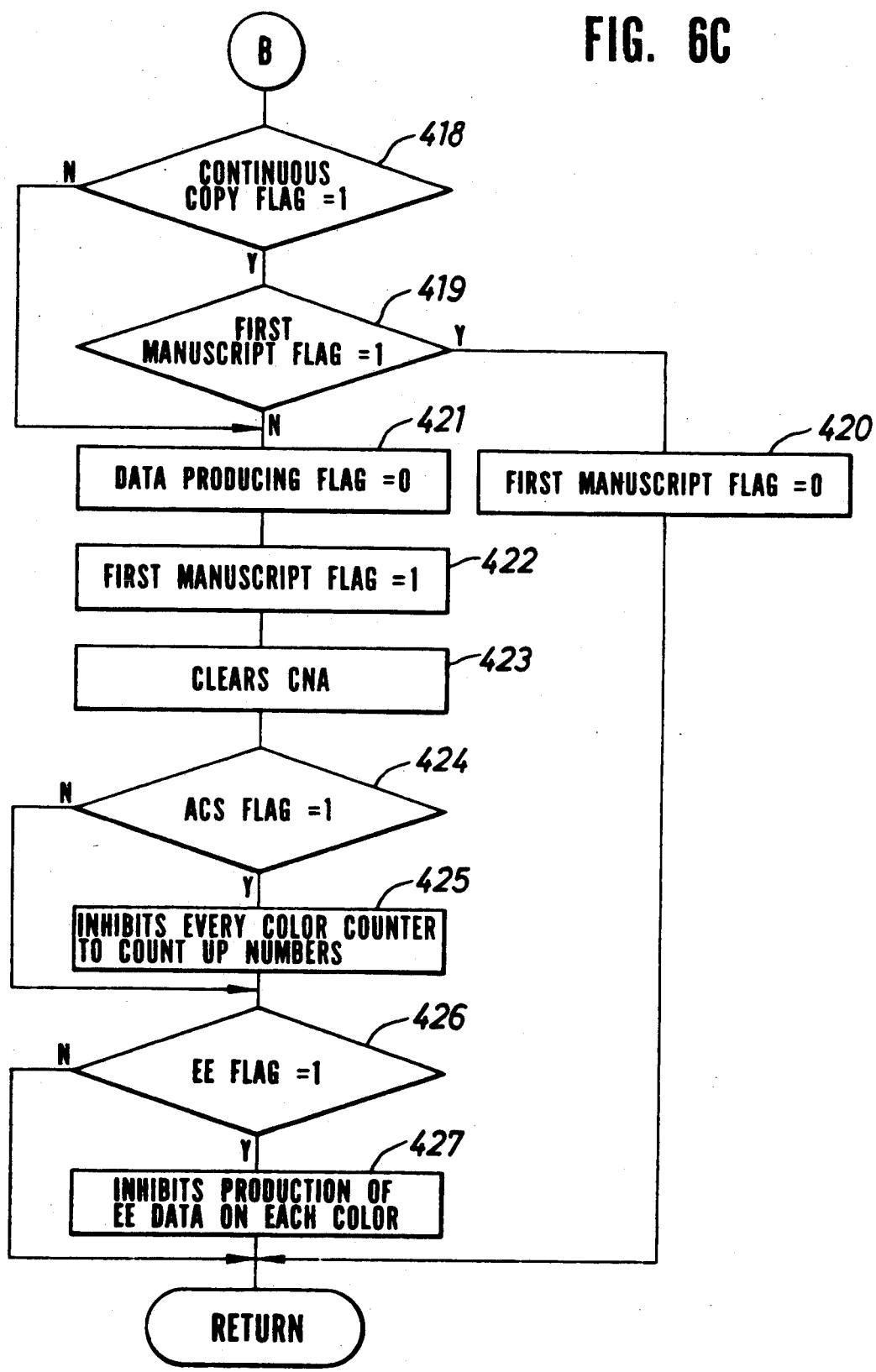

Referring now to the flowchart shown in FIGS. 6A to 6C, when the initial step 401 is entered, the control unit 5 checks to see if the ACS flag is activated, or not. If the ACS flag is already activated, then step 402 is entered, in which the control unit 5 checks to see if the EE flag is already set, or not. If the EE flag is not activated, the whole routine is terminated. If the ACS flag is already set, then step 403 is entered. In other words, if neither the ACS flag nor the EE flag were activated, the whole routine is terminated without performing any process. If at least either of the ACS flag and the EE flag were activated, those processes further than step 403 are executed.

When step 403 is entered, a predetermined value "M" is provided for the data check position constant CNTA which allows the counter CNA to identify the data check timing, where the value "M" corresponds to the size of copying papers stored in a selected cassette Next, step 404 is entered, in which the controller unit 5 checks to see if the data producing flag is already activated, or not. If the data producing flag were not activated, then the whole routine is terminated. If the data producing flag were activated, then the operation mode proceeds to step 405.

When step 405 is entered, the counter CNA is set to the count permissible condition. The allows the counter CNA to start up a counting operation under another routine.

When the next step 406 is entered, the control unit 5 checks to see if the ACS flag is activated, or not. If the ACS flag were already activated, then step 407 is entered to set the color counters 13 to the color data producible condition, and then the step 408 is entered to allow the color discriminating unit 12 to start to produce color data. If the ACS flag were not activated in step 406, then the operation mode proceeds to step 408.

When step 408 is entered, the control unit 5 checks to see if the EE flag were already activated, or not. If so, then step 409 is entered to set the color density discriminating and storing unit 14 to the EE-data producible condition. Then, step 410 is entered, in which the color discriminating unit 12 activates the color density storing unit 14 to start production of the EE data. If the EE flag were not activated in step 408, then the operation mode directly proceeds to step 410.

When step 410 is entered, the control unit 5 checks to see if the content of the counter CNA is already equal to the counter constant CNTA, or not. If both were not even, the whole routine is terminated. If both were even, then step 411 is entered to clear the counter CNA before proceeding to step 412.

When step 412 is entered, the control unit 5 checks to see if the ACS flag is already activated, or not. If the ACS flag were already activated, the step 413 is entered to read the content (color data) stored in the color counters 13 before storing it in a specific position. When the ensuing step 414 is entered, the color counters 13 are cleared. Then, step 415 is entered. If the ACS flag were not activated in step 412, then the operation mode directly proceeds to step 415.

When step 415 is entered, the control unit 5 checks to see if the EE flag is already activated, or not. If it is already activated, then step 416 is entered. When step 416 is underway, the control unit 5 reads the EE data stored in the color density discriminating and storing unit 14, and then stores it in a specific position. Next, step 417 is entered to clear the EE data stored in the memory 14 before proceeding to step 418. If the EE flag were not activated in step 415, then the operation mode directly proceeds to step 418.

When step 418 is entered, the control unit 5 checks to see if the continuous copying flag is already activated, or not. If this flag were already set, then step 419 is entered, in which the control unit 5 checks to see if the first original flag is already activated, or not. When the scanner 7 scans the content of the first page of the original in the course of the preliminary scanning operation under the continuous page copying mode. If the first original flag were already activated in process of step 419, in other words, if the preliminary scanning of the content of the first page of the original were already completed, then step 420 is entered to reset the first original flag before terminating the whole routine. If the first original flag were not activated, then step 421 is entered. If the continuous copying flag were not activated in process of step 418, then the operation mode directly proceeds to step 421.

When step 421 is entered, the data producing flag is reset. When the next step 422 is entered, the first original flag is activated, and then step 423 is entered to clear the counter CNA.

Next, when step 424 is entered, the control unit 5 checks to see if the ACS flag is already activated, or not. If the ACS flag were already set, then step 425 is entered to inhibit the color counter 13 to produce color data. Then, step 426 is entered. As a result, the color discriminating unit 12 cannot produce color data. If the ACS flag were not activated in process of step 424, then the operation mode directly process to step 426.

When step 426 is entered, the control unit 5 checks to see if the EE flag is already activated, or not. If this flag were not activated, then the whole routine is terminated. If the EE flag were already activated, then step 427 is entered to inhibit the color density discriminating and storing unit 14 to produce the EE data before terminating the whole routine. As a result, the color discriminating unit 12 cannot produce the EE data for storage in the memory 14.

When the operator depresses the copy-start button by activating the continuous page copying mode in conjunction with the ACS and EE modes, the forward flag is activated. This causes the operation mode shown in FIG. 5 to proceed from step 301 to 302. When step 302 is underway, the scanner forward signal is output to activate the scanner 7 to start up the preliminary scanning operation at the position "t1" shown in FIG. 7. When the scanner 7 arrives at the tip edge of the original (at the position "t2" shown in FIG. 7), the operation mode shown in FIG. 5 proceeds from step 303 to step 304 to activate the data producing flag. As a result, the counter CNA is cleared, and then the clear signal is output from the control 5 to fully clear the EE data stored in the color control 13 and the memories 14. When the data producing flag is activated, the operation mode shown in FIGS. 6A to 6C proceeds from step 404 to step 405. As soon as the counter CNA starts up counting operation, the color counters 13 start to produce color data, and simultaneously, the memories 14 also start to produce the EE data. Operation for producing these data is executed until the scanner 7 actually arrives at the rear edge of the first page of the original.

When the scanner 7 has arrived at the rear edge (corresponding to the position "t3" shown in FIG. 7) of the first page of the original, the value of the counter CNA is equal to that of the constant CNTA. As a result, the operation mode shown in FIGS. 6A to 6C proceeds from step 410 to 422, in which the counter CNA is cleared for scanning the content of the second page of the original. Then, the control unit 5 checks the color data and the EE data of the content of the first page, and then both the color data and the EE data are cleared so that the data of the content of the second page can be produced.

When the scanner 7 terminates the preliminary scanning of the content of the first page, since the continuous copying flag remains activated under the continuous copying mode, the operation mode shown in FIGS. 6A to 6C proceeds from step 418 to step 419. When the continuous copying flag remains activated, the first original flag also remain activated, and thus step 420 is entered to reset the first original flag to terminate the whole routine. Next, those routines shown in the flowchart of FIGS. 6A to 6C is repeated from the initial step. Like the above case, operation for producing the data of the second page is executed until the scanner 7 arrives at the rear edge from the front edge of the second page of the original.

When the scanner 7 has arrived at the rear edge (corresponding to the position "t4" shown in FIG. 7) of the second page of the original, the value of the counter CNA is equal to that of the constant CNTA. As a result, the operation mode shown in FIGS. 6A to 6C proceeds from step 410 to 411, and then, like the above case, the counter CNA is cleared. While step 411 is underway, the control checks both the color data and the EE data of the content of the second page before fully clearing both the color data and the EE data.

When the scanner 7 completes the preliminary scanning of the content of the second page, the continuous copying flag still remains activated, and thus, the operation mode shown in FIGS. 6A to 6C proceeds from step 418 to step 419. However, when the preliminary scanning of the content of the first page is completed, the first original flag is reset in the following step 420. As a result, the operation mode proceeds from step 419 to 421, in which the data producing flag is reset, whereas the first original flag is activated. As a result, the counter CNA is cleared to inhibit the production of the color data and the EE data. Since the data producing flag remains reset, even if the operation mode proceeds to the flowchart shown in FIGS. 6A to 6C, no routine is executed for producing and checking the data otherwise to be done during steps 405 on.

After completing the preliminary scanning of the content of the second page, when the scanner 7 has arrived at the rear edge (corresponding to the position "t5" shown in FIG. 7) of the second page of the original, the operation mode shown in FIG. 5 proceeds from step 308 to step 309, in which the scanner return signal is output from the controller to bring the scanner 7 back to the home position.

By executing those routines mentioned above, the color image forming apparatus embodied by the invention thus completes the preliminary scanning of the content of the original. Next, based on the color data of the first page, the copying apparatus determines those color available for copying the first page. Likewise, based on the color data of the second page, the image forming apparatus determines those colors available for copying the second page. Based on these selected available colors, the image forming apparatus executes the continuous page copying operation. The image forming apparatus determines the available colors by comparing the value counted by the color counter 13 to the predetermined threshold value close to 0 to selectively use only such a counted value greater than the predetermined threshold value. For example, if the first page consists of red and blue images, both the red counter 13a and the blue counter 13b respectively contain a substantial counted value, whereas the black counter 13c contains a minimal value close to zero. Accordingly, the image forming apparatus selects red and blue colors for copying the content of the first page with red and blue colors.

On the other hand, if the content of the second page merely consists of black image, the black counter 13c contains a substantial counted value, whereas the red counter 13a and the blue counter 13b respectively contain no value, and thus, the image forming apparatus merely selects the black for copying the content of the first page. When executing the copying operation against the first page, based on the EE data covering the content of the first page, individual color density is automatically adjusted. Likewise, when copying the content of the second page, based on the EE data covering the second page, individual color density is automatically adjusted.

When the continuous page copying mode is not activated, since the continuous copying flat is not activated at the moment at which the scanning of the first page image is completed, the operation mode shown in FIGS. 6A to 6C proceeds from step 418 to step 421 to complete the preliminary scanning operation.

If either of the ACS and EE modes is solely activated, as is clear from the flow chart shown in FIGS. 6A to 6C, only the data production and data checking operations are performed under any of the activated modes while the preliminary scanning operation is underway.

When implementing the above embodiment, both the chromatic data and the EE data of the first and second pages of the original are produced for the identical color counter 13 and stored in the identical memory 14. However, it is possible for the embodiment to independently provide the color counters and the memories for copying the first and second pages.

As is clear from the above description, according to the invention, when the color image forming apparatus embodied by the invention executes a copying operation by jointly activating the continuous page copying mode and the automatic color selection mode, even if there were a certain difference in the chromatic conditions between two pages of the original for ex ample, the color image forming apparatus can execute copying of the content of respective pages of the original by applying optimum colors and copying processes perfectly compatible with the chromatic conditions of respective pages of the original. This in turn prevents the copying apparatus embodied by the invention from executing unnecessary additional copying processes, thus significantly promoting the copying efficiency.

What we claim is:

1. A color image forming apparatus comprising:

an image reading means for reading an image of an original by scanning said original and separating said scanned image into at lest two colors;

an image processing means for processing the output from said image reading means to output at least two-color image data;

an image recording means for forming at least two color images in an image region of an image retainer on the basis of said image data and transferring said at least two-color images onto a copying paper;

wherein said color image forming apparatus is designed to operate in a continuous page copying mode for copying images on two pages of said original onto two copying papers page by page and/or in an automatic color selection mode for automatically determining available colors and copying processes compatible with said available colors by discriminating chromatic conditions of the image of said original by executing a preliminary scanning operation prior to a normal scanning operation;

a color discriminating means for discriminating chromatic conditions of the first and second pages separately by said preliminary scanning under said continuous page copying mode, and said automatic color selection mode and;

a color control means for automatically determining available colors and copying processes on the basis of color data for the first page and likewise, available colors and copying processes on the basis of color data for the second page.

2. The color image forming apparatus according to claim 1 wherein the apparatus is designed to operate in an automatic density control mode in which copying density is automatically controlled by detecting density of an original by a preliminary scanning operation prior to a normal scanning operation and further comprising;

a density detecting means for detecting density of the first and the second pages of the original separately in the continuous page copying mode, in the automatic color selection mode and in the automatic density control mode and;

a density control means for controlling the density of recorded images of the first page on the basis of density data of the first page of the original and the density of recorded images of the second page on the basis of density data of the second page of the original.

3. The color image forming apparatus according to claim 2 wherein said density control means automatically controls density of recorded images for each color.

* * * * *